US012401124B2

(12) United States Patent

Jheng et al.

(10) Patent No.: US 12,401,124 B2
(45) Date of Patent: Aug. 26, 2025

(54) WIRELESS COMMUNICATION DEVICE

(71) Applicant: WISTRON NEWEB CORPORATION, Hsinchu (TW)

(72) Inventors: Kai-Hong Jheng, Hsinchu (TW); Kuang-Yuan Ku, Hsinchu (TW)

(73) Assignee: WISTRON NEWEB CORPORATION, Hsinchu (TW)

(*) Notice: Subject to any disclaimer, the term of this patent is extended or adjusted under 35 U.S.C. 154(b) by 154 days.

(21) Appl. No.: 18/454,989

(22) Filed: Aug. 24, 2023

(65) Prior Publication Data

US 2024/0204421 A1 Jun. 20, 2024

(30) Foreign Application Priority Data

Dec. 20, 2022 (TW) ................................ 111148848

(51) Int. Cl.

*H01Q 9/04* (2006.01)
*H01Q 21/00* (2006.01)
*H01Q 21/06* (2006.01)

(52) U.S. Cl.

CPC ......... *H01Q 9/0414* (2013.01); *H01Q 9/0435* (2013.01); *H01Q 21/0075* (2013.01); *H01Q 21/065* (2013.01)

(58) Field of Classification Search

CPC ............... H01Q 9/0414; H01Q 9/0435; H01Q 21/0075; H01Q 21/065

See application file for complete search history.

(56) References Cited

U.S. PATENT DOCUMENTS

| | | | | |
|---|---|---|---|---|
| 2008/0036665 A1* | 2/2008 | Schadler | H01Q 9/0435 343/700 MS |
| 2013/0044035 A1* | 2/2013 | Zhuang | H01Q 9/0428 343/770 |
| 2018/0159203 A1* | 6/2018 | Baks | H01Q 9/045 |
| 2021/0075107 A1* | 3/2021 | Tehran | H01Q 21/065 |

FOREIGN PATENT DOCUMENTS

TW 202109975 A 3/2021

* cited by examiner

*Primary Examiner* — Daniel Munoz

(74) *Attorney, Agent, or Firm* — McClure, Qualey & Rodack, LLP

(57) ABSTRACT

A wireless communication device includes a carrier, a first antenna array, and a first power divider. The first antenna array includes two first antenna elements and two second antenna elements. The two second antenna elements correspond to the two first antenna elements, respectively. Each of the second antenna elements and a corresponding one of the first antenna elements are separate from and coupled to each other. The first power divider includes a first extension section and two first coupling sections. The first extension section is connected between the two first coupling sections. The two first coupling sections and the two first antenna elements are separate with each other. The two first coupling sections are respectively coupled to the two first antenna elements, such that the first antenna array is used to generate a radiation pattern having a first polarization direction.

16 Claims, 10 Drawing Sheets

WIRELESS COMMUNICATION DEVICE

CROSS-REFERENCE TO RELATED PATENT APPLICATION

This application claims the benefit of priority to Taiwan Patent Application No. 111148848, filed on Dec. 20, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a wireless communication device, and more particularly to a wireless communication device having a stacked antenna structure.

BACKGROUND OF THE DISCLOSURE

Customer premises equipment (CPE) applied to the 5G network is mainly used to receive and convert 5G signals emitted by base stations into WI-FI® signals or wired signals for end-user devices (such as a cell phone, a tablet, or a laptop). In the related art, antenna structures in CPE products have large sizes, which leaves room for improvement in structural design thereof. In addition, CPE products have more and more bandwidth requirements with the popularization of 5G.

Therefore, how to reduce the size of the antenna structure and satisfy the bandwidth requirements of the users through an improvement in the structural design has become one of the important issues to be solved in the art.

SUMMARY OF THE DISCLOSURE

In response to the above-referenced technical inadequacy, the present disclosure provides a wireless communication device, so as to address an issue of existing CPE products not being able to satisfy miniaturization requirements and incorporate bandwidth enhancements.

In order to solve the above-mentioned problem, one of the technical aspects adopted by the present disclosure is to provide a wireless communication device, which includes a carrier, a first antenna array, and a first power divider. The carrier has a first surface and a second surface that are opposite to each other. The first antenna array is disposed on the carrier. The first antenna array includes two first antenna elements and two second antenna elements. The first power divider is disposed on the carrier. The first power divider includes a first extension section and two first coupling sections. The first extension section is connected between the two first coupling sections, and the two first coupling sections and the two first antenna elements are separate with each other. The two first coupling sections are respectively coupled to the two first antenna elements, such that the first antenna array is used to generate a radiation pattern having a first polarization direction.

Therefore, in the wireless communication device provided by the present disclosure, by virtue of "the two second antenna elements respectively corresponding to the two first antenna elements, and each of the two second antenna elements and a corresponding one of the first antenna elements being separate from and coupled to each other" and "the two first coupling sections being respectively coupled to the two first antenna elements, such that the first antenna array is used to generate a radiation pattern having a first polarization direction," a stacked antenna structure can be formed to satisfy the miniaturization requirements and incorporate the bandwidth enhancements.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
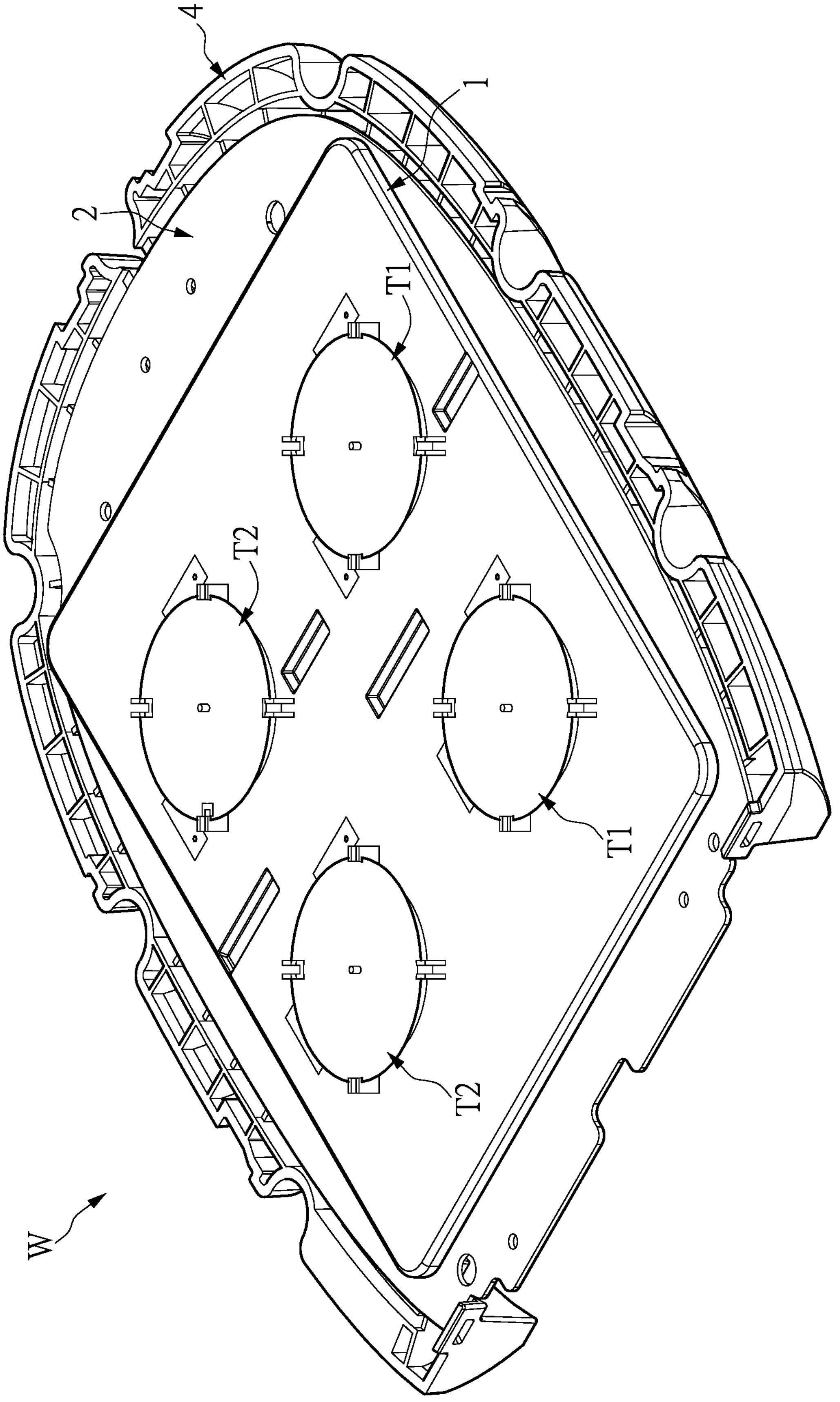
FIG. 1 is a schematic view of a wireless communication device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

In addition, the term "connect" or "connected" in the context of the present disclosure means that there is a physical connection between two elements, and the two elements are directly or indirectly connected. The term "couple" or "coupled" in the context of the present disclosure means that two elements are separate from each other and have no physical connection therebetween, and an electric field energy generated by one of the two elements excites an electric field energy generated by another one of the two elements.

First Embodiment

Figure 2:
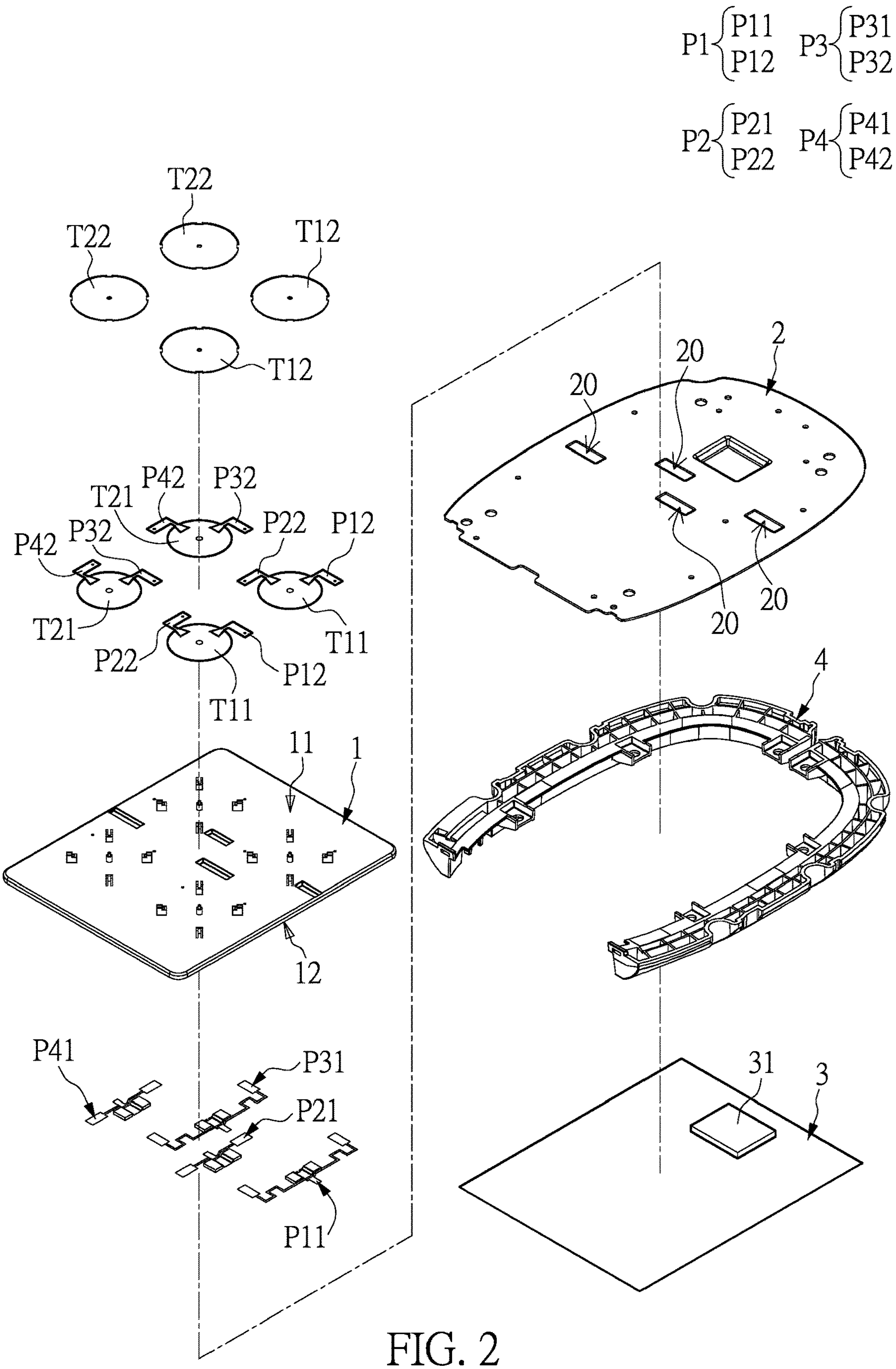
FIG. 2 is a schematic exploded view of the wireless communication device according to the first embodiment of the present disclosure.

Referring to FIG. 1 and FIG. 2, FIG. 1 is a schematic view of a wireless communication device according to a first embodiment of the present disclosure, and FIG. 2 is a schematic exploded view of the wireless communication device according to the first embodiment of the present disclosure. A first embodiment of the present disclosure provides a wireless communication device W, which includes a carrier 1, a first antenna array T1, and a first power divider P1. The carrier has a first surface 11 and a second surface 12 that are opposite to each other. The first antenna array T1 is disposed on the carrier 1. The first antenna array T1 includes two first antenna elements T11 and two second antenna elements T12. The two first antenna elements T11 are disposed on the first surface 11. The two second antenna elements T12 are disposed on the carrier 1. For example, carrier 1 includes a central column and supporting columns that surround the central column, and each of the two second antenna elements T12 is fixed to the carrier 1 by the central column and the supporting columns. The two second antenna elements T12 respectively correspond to the two first antenna elements T11. Therefore, each of the two second antenna elements T12 and the corresponding first antenna element T11 are separate from each other and coupled to each other.

Figure 3:
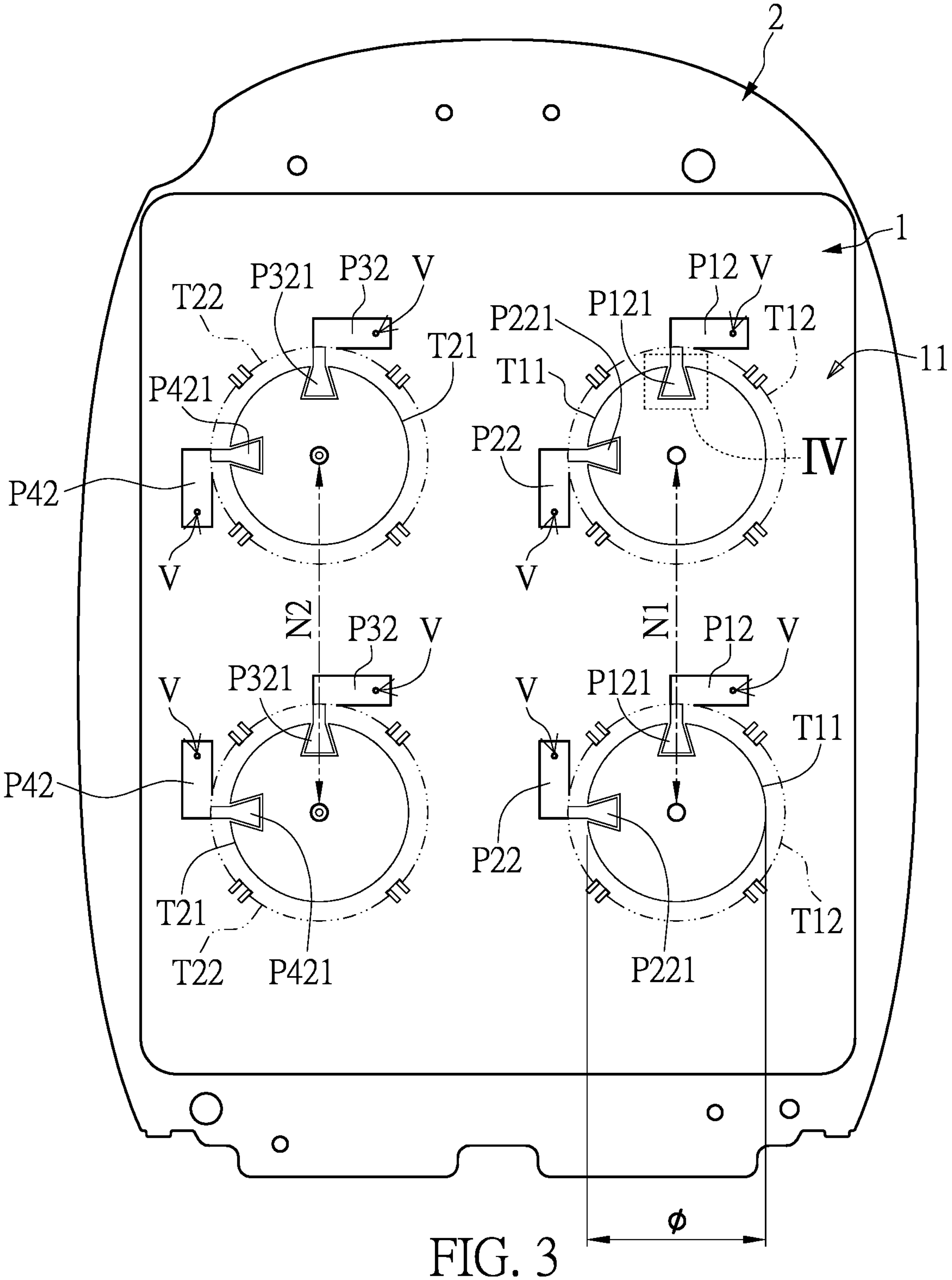
FIG. 3 is a schematic view of an antenna element and a power divider of the wireless communication device according to the first embodiment of the present disclosure.
Figure 4:
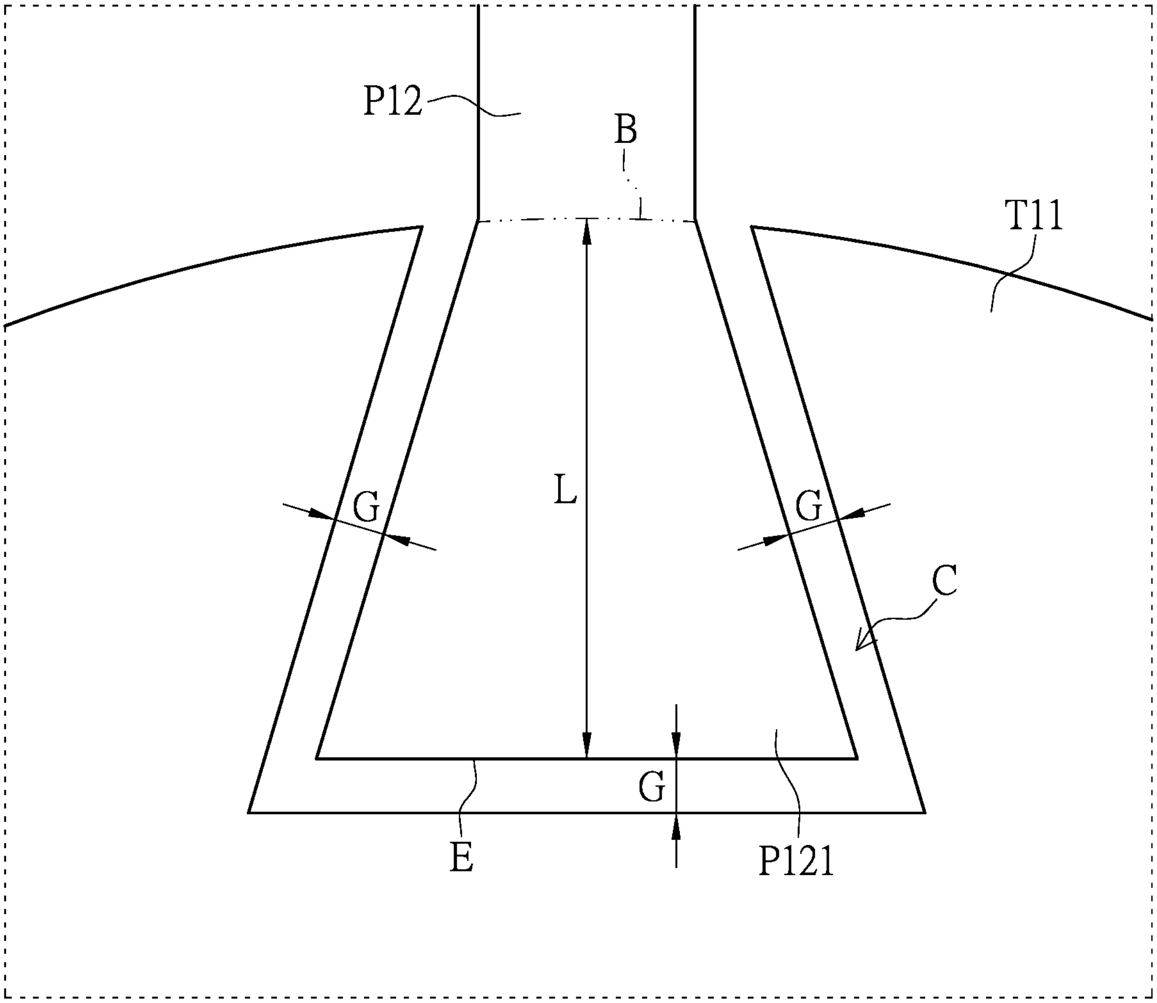
FIG. 4 is a schematic enlarged view of part IV of FIG. 3.

Referring to FIG. 3 and FIG. 4, FIG. 4 is a schematic enlarged view of part IV of FIG. 3. The first power divider P1 is disposed on the carrier 1. The first power divider P1 includes a first extension section P11 and two first coupling sections P12. The first extension section P11 is connected between the two first coupling sections P12, and the two first coupling sections P12 and the two first antenna elements T11 are separate with each other. The wireless communication device W further includes a second power divider P2. The second power divider P2 is disposed on the carrier 1. The second power divider P2 includes a second extension section P21 and two second coupling sections P22. The second extension section P21 is connected between the two second coupling sections P22, and the two second coupling sections P22 and the two first antenna elements T11 are separate with each other.

Furthermore, the two first coupling sections P12 respectively have two first coupling portions P121, and the two second coupling sections P22 respectively have two second coupling portions P221. Each of the two first antenna elements T11 has two notches C, and one of the two first coupling portions P121 and one of the two second coupling portions P221 respectively extend into the two notches C. An edge of each of the two notches C and a corresponding one of the first coupling portions P121 and the second coupling portions P221 have a coupling gap G therebetween. Preferably, the coupling gap C ranges between 0.2 mm and 2 mm. The two first coupling sections P12 are respectively coupled to the two first antenna elements T11 through the two first coupling portions P121. Therefore, a signal can be fed from the two first coupling sections P12 to the two first antenna elements T11 by way of coupling, and the two first antenna elements T11 are respectively coupled to the two second antenna elements T12, such that the first antenna array T1 is used to generate a first radiation pattern having a first polarization direction. Similarly, the two second coupling sections P22 are respectively coupled to the two first antenna elements T11 through the two second coupling portions P221. The signal can be fed from the two second coupling sections P22 to the two first antenna elements T11 by way of coupling, and the two first antenna elements T11 are respectively coupled to the two second antenna elements T12, such that the first antenna array T1 is used to generate a second radiation pattern having a second polarization direction. For example, the first polarization direction can be a horizontal direction, the second polarization direction can be a vertical direction, and the first polarization direction and the second polarization direction are orthogonal to each other.

Reference is further made to FIGS. 2 and 3. The wireless communication device W further includes a second antenna array T2, a third power divider P3, and a fourth power divider P4. The second antenna array T2 is disposed on the carrier 1 and arranged side by side with the first antenna array T1. The second antenna array T2 includes two third antenna elements T21 and two fourth antenna elements T22. The two third antenna elements T21 are disposed on the first surface 11 of the carrier 1, and the two fourth antenna elements T22 are disposed on the carrier 1. The two fourth antenna elements T22 are fixed to the carrier 1 in a manner similar to that of the second antenna elements T12, which will not be reiterated herein. The two fourth antenna elements T22 correspond to the two third antenna elements T21, respectively. Each of the third antenna elements T21 and a corresponding one of the fourth antenna elements T22 are separate from and coupled to each other. The structure of the third antenna elements T21 is the same as that of the first antenna elements T11 (including the shape and the size), and the structure of the fourth antenna elements T22 is the same as that of the second antenna elements T12 (including the shape and the size).

An orthogonal projection of each of the second antenna elements T12 projected onto the carrier 1 is greater than an orthogonal projection of a corresponding one of the first antenna elements T11 projected onto the carrier 1. Moreover, the orthogonal projection of each of the second antenna elements T12 projected onto the carrier completely overlaps with the orthogonal projection of the corresponding one of the first antenna elements T11 projected onto the carrier 1. An orthogonal projection of each of the fourth antenna elements T22 projected onto the carrier 1 is greater than an orthogonal projection of a corresponding one of the third antenna elements T21 projected onto the carrier 1. Moreover, the orthogonal projection of each of the fourth antenna elements T22 projected onto the carrier 1 completely overlaps with the orthogonal projection of the corresponding one of the third antenna elements T21 projected onto the carrier 1. Through the structural configuration mentioned above, impedance matching generated by an antenna structure (the first antenna array T1 and the second antenna array T2) can be adjusted and optimized in the present disclosure, and a stable antenna performance (such as radiation directivities) can be provided. In addition, the first antenna element T11 to the fourth antenna element T22 are circular in shape, but the present disclosure is not limited thereto.

The third power divider P3 includes a third extension section P31 and two third coupling sections P32. The third extension section P31 is connected between the two third coupling sections P32. The two third coupling sections P32 and the two third antenna elements T21 are separate with each other. The fourth power divider P4 includes a fourth extension section P41 and two fourth coupling sections P42. The fourth extension section P41 is connected between the two fourth coupling sections P42. The two fourth coupling sections P42 and the two third antenna elements T21 are separate with each other.

The two third coupling sections P32 respectively have two third coupling portions P321, and the two fourth coupling sections P42 respectively have two fourth coupling portions P421. Each of the two third antenna elements T21 has two notches C, and one of the two third coupling portions P321 and one of the two fourth coupling portions P421 respectively extend into the two notches C. An edge of each of the two notches C and a corresponding one of the third coupling portions P321 and the fourth coupling portions P421 have a coupling gap G therebetween.

Therefore, the two third coupling sections P32 are respectively coupled to the two third antenna elements T21 through the two third coupling portions P321. The signal can be fed from the two third coupling portions P321 to the two third antenna elements T21 by way of coupling, and the two third antenna elements T21 are respectively coupled to the two fourth antenna elements T22, such that the second antenna array T2 is used to generate a third radiation pattern having a third polarization direction. Similarly, the two fourth coupling sections P42 are respectively coupled to the two third antenna elements T21 through the two fourth coupling portions P421. The signal can be fed from the two fourth coupling portions P421 to the two third antenna elements T21 by way of coupling, and the two third antenna elements T21 are respectively coupled to the two fourth antenna elements T22, such that the second antenna array T2 is used to generate a fourth radiation pattern having a fourth polarization direction. For example, the third polarization direction can be a horizontal direction, the fourth polarization direction can be a vertical direction, and the third polarization direction and the fourth polarization direction are orthogonal to each other.

In the present disclosure, the first antenna array T1 and the second antenna array T2 are configured to operate in an operating frequency band. For example, the operating frequency band ranges between 3,300 MHz and 4,200 MHz. Two center points of the two first antenna elements T11 or the two second antenna elements T12 have a first predetermined distance N1 therebetween, and the first predetermined distance N1 is greater than one-half wavelength of a center frequency (3,750 MHz) of the operating frequency band. Similarly, two center points of the two third antenna elements T21 or the two fourth antenna elements T22 have a second predetermined distance N2 therebetween, and the second predetermined distance N2 is greater than one-half wavelength of the center frequency (3,750 MHz) of the operating frequency band.

It is worth mentioning that, as shown in FIG. 2, a length of each of the first extension section P11 of the first power divider P1 and the third extension section P31 of the third power divider P3 is greater than a length of each of the second extension section P21 of the second power divider P2 and the fourth extension section P41 of the fourth power divider P4. Each of the first extension section P11 of the first power divider P1 and the third extension section P31 of the third power divider P3 has a bent shape. Through the configuration of the first extension section P11 and the third extension section P31, the first power divider P1 and the second power divider P2 have consistent phases when being coupled to and fed into the first antenna array T1, and the third power divider P3 and the fourth power divider P4 have consistent phases when being coupled to and fed into the second antenna array T2.

In the present disclosure, the first antenna element T11, the third antenna elements T21, the first power divider P1, the second power divider P2, the third power divider P3, and the fourth power divider P4 are formed on the carrier 1 by laser direct structuring, but the present disclosure is not limited thereto. Through the laser direct structuring (LDS) process, antenna elements (the first antenna elements T11 and the third antenna elements T21) and power dividers (the first power divider P1 to the fourth power divider P4) can be integrated onto the carrier 1, so as to ensure that the coupling gap G is constant and short-circuit connection does not occur.

Figure 5:
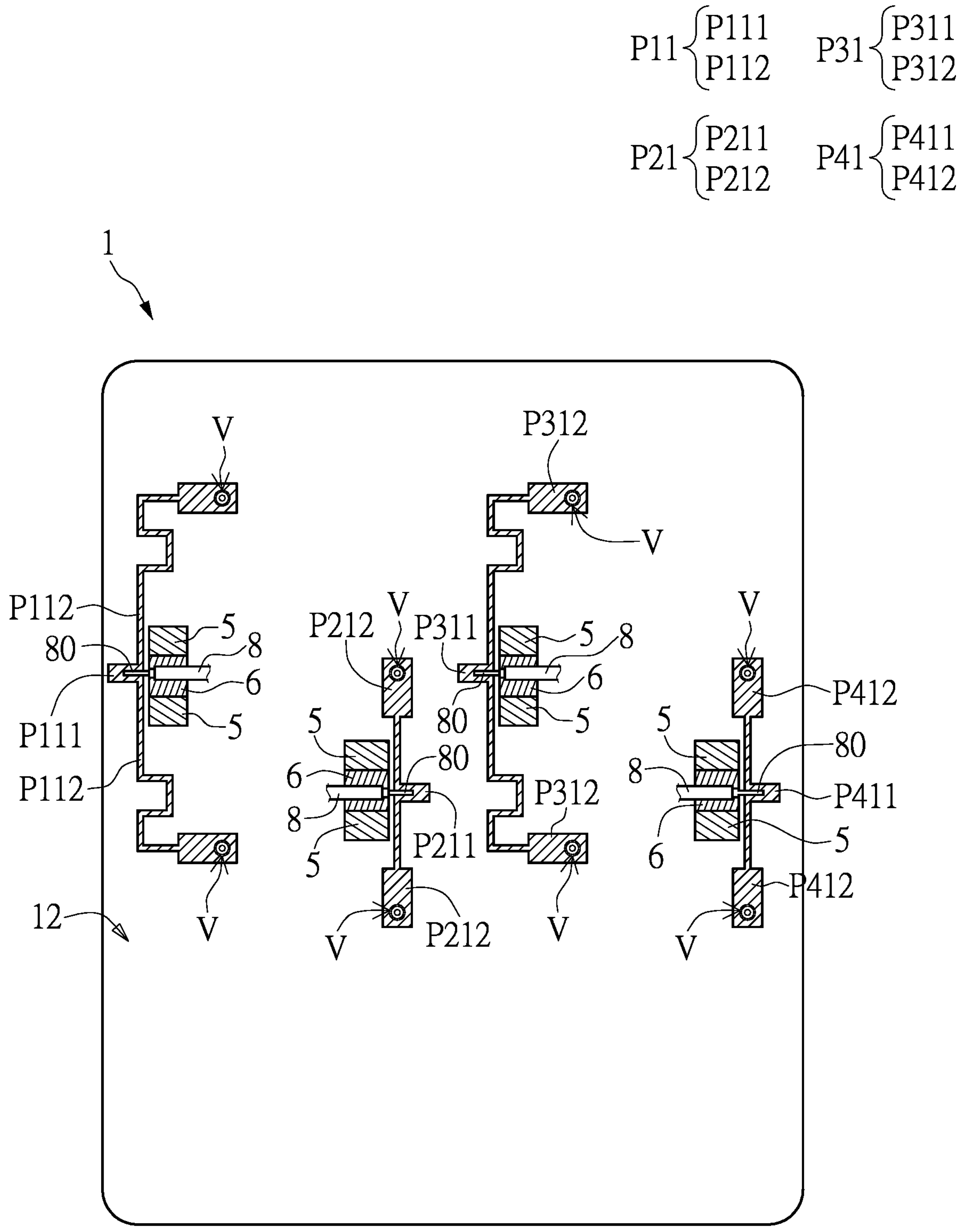
FIG. 5 is a schematic view showing connections of a coaxial cable of the wireless communication device according to the first embodiment of the present disclosure.

Referring to FIG. 3 and FIG. 5, FIG. 5 is a schematic view showing connections of a coaxial cable of the wireless communication device according to the first embodiment of the present disclosure. In the present embodiment, the first power divider P1, the second power divider P2, the third power divider P3, and the fourth power divider P4 are alternately arranged. The first power divider P1 and the second power divider P2 are disposed at two sides of the first antenna array T1 respectively, and the third power divider P3 and the fourth power divider P4 are disposed at two sides of the second antenna array T2 respectively. The second power divider P2 and the third power divider P3 are disposed between the first antenna array T1 and the second antenna array T2. In addition, the two first coupling sections P12, the two second coupling sections P22, the two third coupling sections P32, and the two fourth coupling sections P42 are disposed on the first surface 1 of the carrier 1. The first extension section P11, the second extension section P21, the third extension section P31, and the fourth extension section P41 are disposed on the second surface 12 of the carrier 1. By disposing the first extension section P11, the second extension section P21, the third extension section P31, and the fourth extension section P41 on the second surface 12, leakage during signal transmission can be reduced to maintain stable antenna characteristics.

In the first embodiment, the first extension section P11 includes a first input section P111 and two first output sections P112. The second extension section P21 includes a second input section P211 and two second output sections P212. The third extension section P31 includes a third input section P311 and two third output sections P312. The fourth extension section P41 includes a fourth input section P411 and two fourth output sections P412. The two first output sections P112 correspond to the two first coupling sections P12, respectively. The two second output sections P212 correspond to the two second coupling sections P22, respectively. The two third output sections P312 correspond to the two third coupling sections P32, respectively. The two fourth output sections P412 correspond to the two fourth coupling sections P42, respectively. For example, several conductive vias V can be formed on the carrier 1, and the conductive vias V can be disposed between two output sections and the corresponding two coupling sections of each power divider (the first power divider P1 to the fourth power divider P4), such that the extension section is electrically connected between the two coupling sections. However, the present disclosure is not limited thereto.

Reference is further made to FIGS. 3 and 4. Taking one of the first antenna elements T11 as an example, each of the first coupling portions P121 and each of the second coupling portions P221 can define one boundary line B along the outline of the first antenna element T11. Similarly, each of the third coupling portions P321 and each of the fourth coupling portions P421 can define another boundary line B along the outline of the first antenna element T11. Taking one of the first coupling portions P121 and one of the first antenna elements T11 as an example, the boundary line B and an end portion E of the first coupling portion P121 have a maximum distance L therebetween, and the maximum distance L is a feed-in length of the first coupling portion P121. The maximum distance L varies with the size of the first antenna element T11, and the size of the first antenna element T11 is adjusted according to the range of the operating frequency band. For example, if a diameter Ø of the first antenna element T11 is 30 mm, a ratio of the maximum distance L to the diameter Ø of the first antenna element T11 is preferably between 0.1 and 0.24. Within said ratio range, the first coupling portion P121 and the first antenna element T11 can have improved impedance matching and coupling effects therebetween.

For example, coupling portions (the first coupling portion P121, the second coupling portion P221, the third coupling portion P321, and the fourth coupling portion P421) of the present disclosure have trapezoidal shapes (a length of the boundary line B is less than a length of the end portion E), inverted trapezoidal shapes (the length of the boundary line B is greater than the length of the end portion E), or rectangular shapes (the length of the boundary line B is equal to the length of the end portion E), but the shape of the coupling portions is not limited thereto. More specifically, in an exemplary embodiment of the present disclosure, the coupling portions are trapezoidal in shape. Compared with the coupling portions that are inverted trapezoidal shaped or rectangular shaped, the feed-in lengths (i.e., the maximum distances L) of the coupling portions that are trapezoidal shaped can have improved impedance matching. In addition, the feed-in lengths of the coupling portions that are inverted trapezoidal shaped or rectangular shaped need to be longer, so as to have the same coupling effect as the coupling portions that are trapezoidal shaped. However, taking the first coupling portions P121 and the second coupling portions P221 as an example (as shown in FIG. 3 and FIG. 4), the longer the feed-in lengths of the first coupling portions P121 and the second coupling portions P221 are, the closer the first coupling portions P121 are to the second coupling portions P221. This may cause an isolation between a first electric field generated by the first power divider P1 being coupled with the first antenna array T1 and a second electric field generated by the second power divider P2 being coupled with the first antenna array T1 to become poor.

Figure 6:
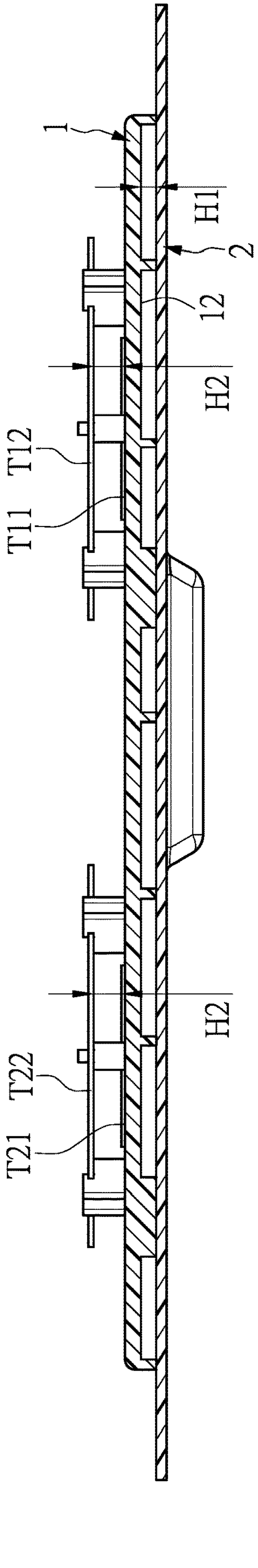
FIG. 6 is a partial schematic cross-sectional view of the wireless communication device according to the present disclosure.

Referring to FIG. 2 and FIG. 6, FIG. 6 is a partial schematic cross-sectional view of the wireless communication device according to the present disclosure. The wireless communication device further includes a ground plate 2 disposed at one side close to the second surface 12 of the carrier 1. For ease of illustration, FIG. 6 only shows the ground plate 2, the carrier 1, and the antenna elements (the first antenna elements T11 to the fourth antenna elements T22). As shown in FIG. 6, the ground plate 2 and the second surface 12 of the carrier 1 have a first air gap H1 therebetween. A second air gap H2 is defined between each of the first antenna elements T11 and a corresponding one of the second antenna elements T12, and between each of the third antenna elements T21 and a corresponding one of the fourth antenna elements T22. The second air gap H2 is greater than the first air gap H1. Preferably, the first air gap H is 1.5 mm, the second air gap H2 is 3 mm, and a thickness of the carrier 1 is 1.5 mm. Since the first antenna elements T11, the third antenna elements T21, the first power divider P1, the second power divider P2, the third power divider P3, and the fourth power divider P4 can be made by laser direct structuring, the sizes of the first air gap H1 and the second air gap H2 can be flexibly adjusted to achieve high-gain antenna characteristics.

Figure 7:
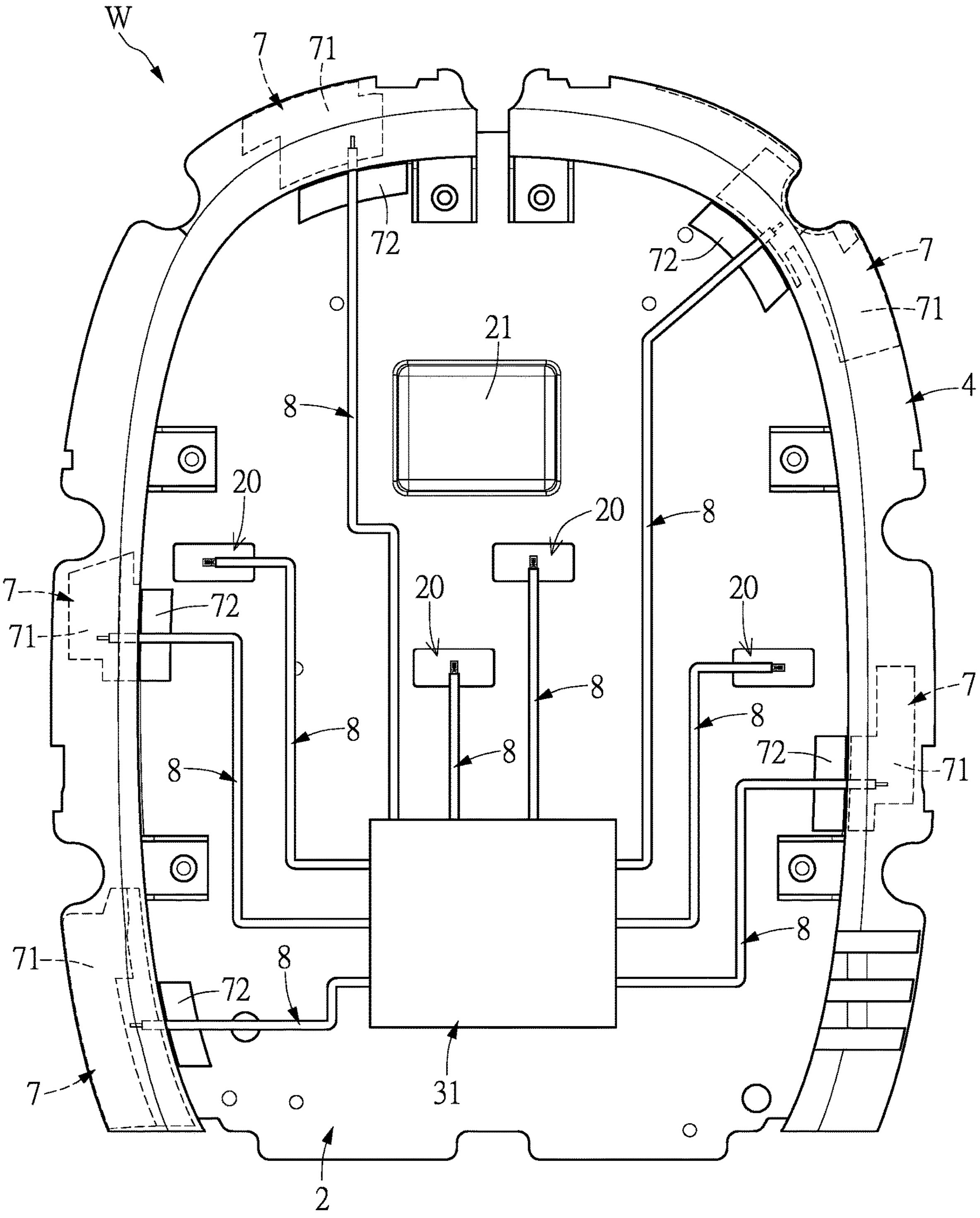
FIG. 7 is a schematic view showing circuit connections of the wireless communication device according to the present disclosure.

Referring to FIG. 2 and FIG. 7, FIG. 7 is a schematic view showing circuit connections of the wireless communication device according to the present disclosure. The wireless communication device W further includes a mainboard 3 and an annular frame 4. The mainboard 3 includes a radio frequency (RF) module 31 and other electronic components. The mainboard 3 and the carrier 1 are respectively disposed at opposite sides of the ground plate 2. The annular frame 4 surrounds the ground plate 2 and fixes the ground plate 2 and the mainboard 3. In this embodiment, an outline of the annular frame 4 is substantially elliptical in shape, and the annular frame 4 includes two frame parts. However, the present disclosure is not limited thereto. That is, the outline of the annular frame 4 can be of any shape, and there is no limitation on a quantity of the frame parts.

The ground plate 2 further has a protrusion region 21, and the protrusion region 21 extends in a direction toward the mainboard 3. More specifically, the protrusion region 21 extends toward a heat source of the mainboard 3 (i.e., the RF module 31). When the annular frame 4 fixes the ground plate 2 and the mainboard 3, the protrusion region 21 of the ground plate 2 contacts the mainboard 3 (i.e., the electronic components on the mainboard 3, such as, but not limited to, the RF module 31), such that the heat generated by the electronic components on the mainboard 3 can be conducted through the ground plate 2 for heat dissipation. In addition, the ground plate 2 can assist the first antenna array T1 and the second antenna array T2 to provide relatively stable radiation directivities and adjust an antenna gain thereof. It should be noted that the RF module 31 shown in FIG. 7 is actually disposed on the mainboard 3, but the mainboard 3 is omitted for more conveniently showing a positional relationship between the RF module 31 and the ground plate 2. Furthermore, the positional relationship between the RF module 31 and the ground plate 2 shown in FIG. 7 is for reference only, and does not represent an actual position of the RF module 31 (reference can be made to FIG. 2 for the actual position of the RF module 31). The actual position of the RF module 31 can be in contact with the protrusion region 21, or can be adjusted according to circuit routing requirements around the RF module 31.

Referring to FIG. 5 and FIG. 7, the ground plate 2 has four through holes 20. The RF module 31 can be electrically connected to the first input section P111, the second input section P211, the third input section P311, and the fourth input section P411 through four coaxial cables 8 that respectively pass through the four through holes 20. As shown in FIG. 5, the second surface 12 of the carrier 1 can be provided with four grounding areas 6, and two conductive pads 5 (e.g., gaskets) are respectively disposed on two sides of each of the grounding areas 6. The carrier 1 can be electrically connected to the ground plate 2 through the conductive pads 5. Hence, each of the grounding areas 6 can be grounded through the conductive pads 5 on both sides thereof. A signal line 80 of each of the coaxial cables 8 is electrically connected to the corresponding input section. In addition, it should be noted that neither the grounding areas 6 nor the conductive pads 5 are in contact with the power dividers (the first power divider P1 to the fourth power divider P4).

Reference is made to FIG. 7. For example, the wireless communication device W further includes an omnidirectional antenna structure 7 disposed on the annular frame 4. The omnidirectional antenna structure 7 can provide an operating frequency band that includes 700 MHz to 960 MHZ, 1,710 MHz to 2,170 MHz, and 2,300 MHz to 2,700 MHz. The omnidirectional antenna structure 7 includes five radiating elements 71 and five corresponding ground elements 72, which are evenly distributed in the annular frame 4. The radiating elements 71 and the ground elements 72 can be metal sheets, flexible printed circuit boards (FPCB), or other conductors with conductivities. In the present disclosure, there is no limitation on the shape and the material of the omnidirectional antenna structure 7, and the omnidirectional antenna structure 7 is not limited to being disposed on the annular frame 4. Quantities of the radiating elements 71 and the ground elements 72 are also not limited in the present disclosure. The RF module 31 can be electrically connected to the five radiating elements 71 through another five coaxial cables 8. The ground elements 72 are electrically connected to the ground plate 2. Furthermore, a vertical projection of the radiating elements 71 onto a plane does not overlap with a vertical projection of the ground plate 2 onto the plane. That is, at least one of the radiating elements 71 is located in an antenna clearance area (not covered by metal elements such as the ground plate 2).

Second Embodiment

Figure 8:
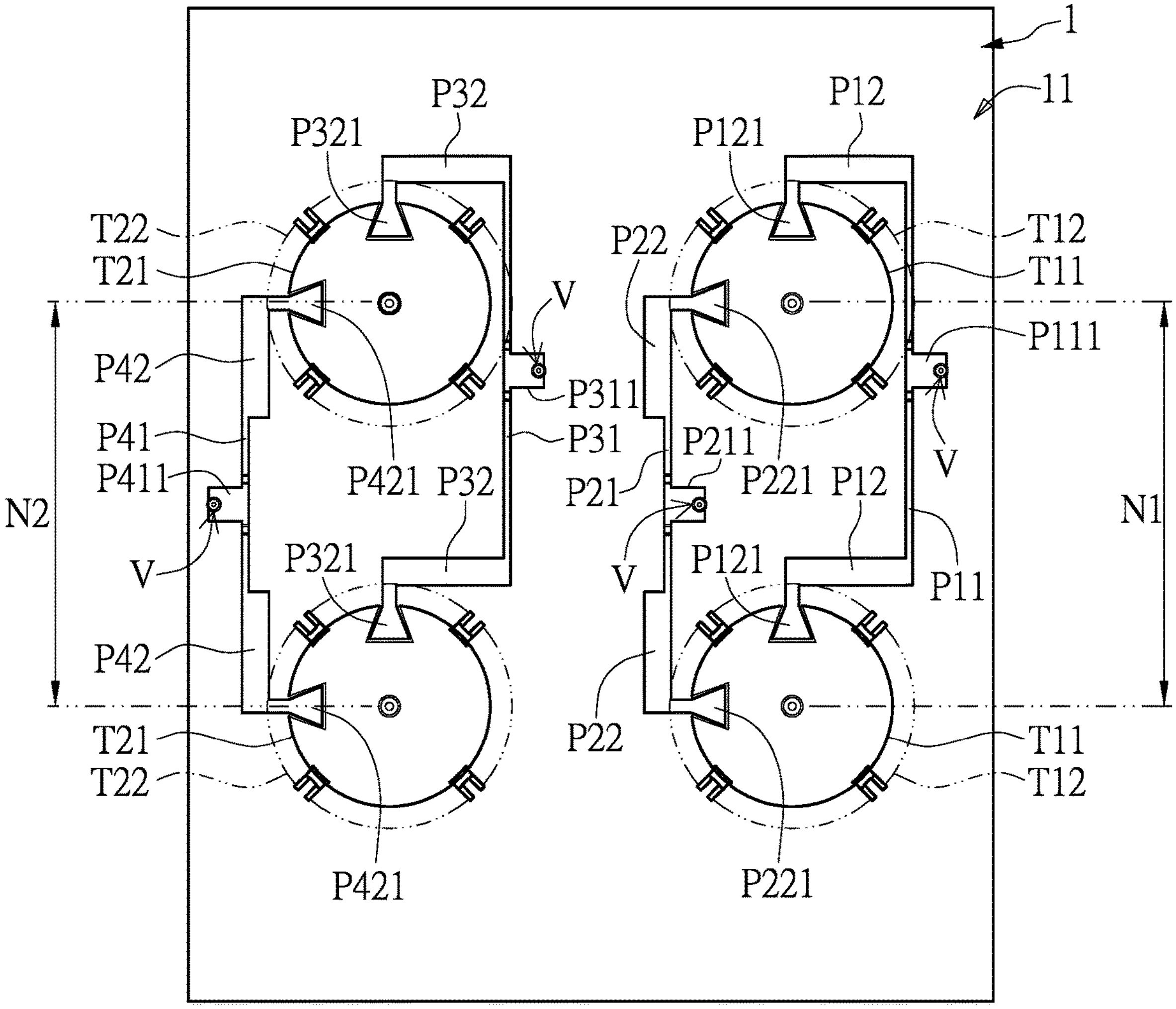
FIG. 8 is a schematic view of the antenna element and the power divider of the wireless communication device according to a second embodiment of the present disclosure.
Figure 9:
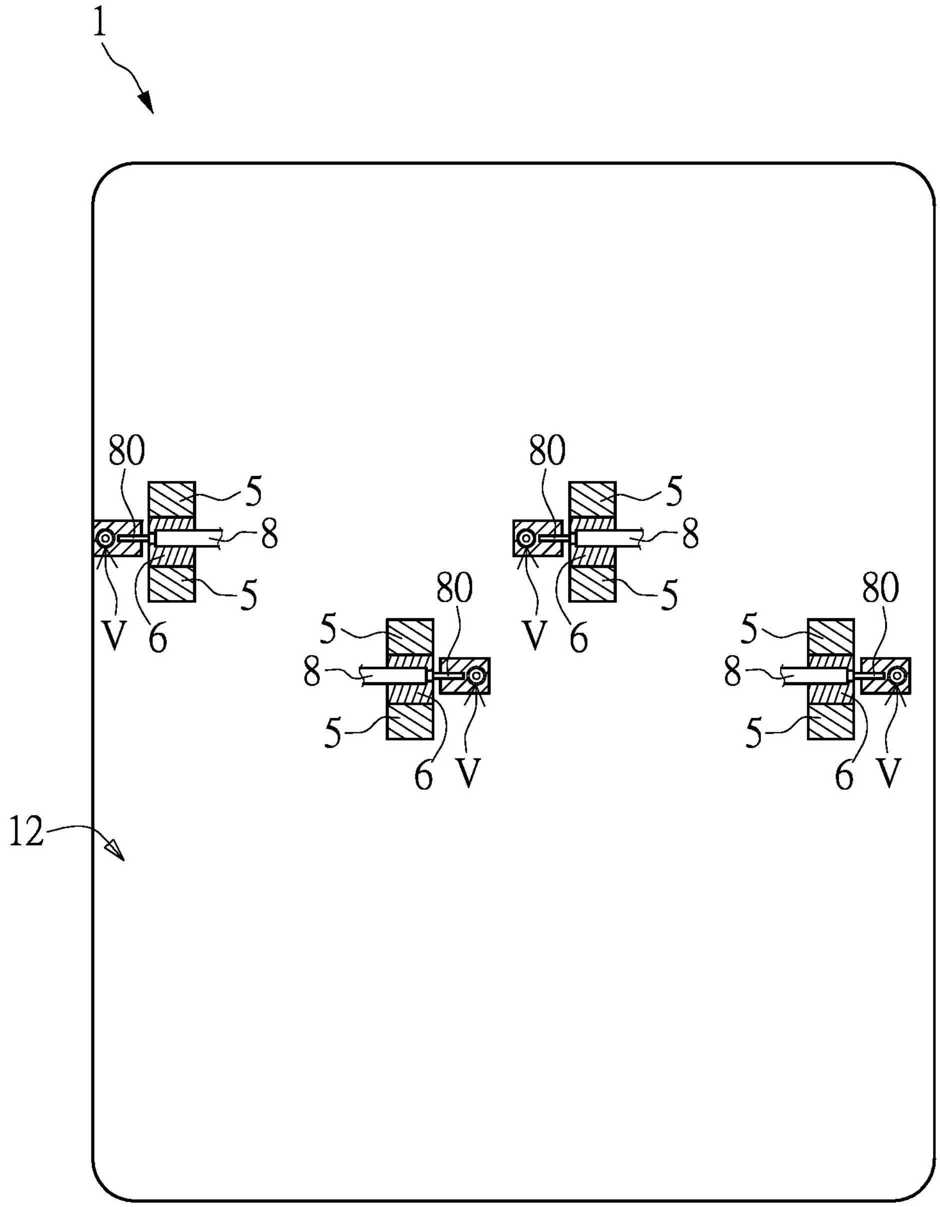
FIG. 9 is a schematic view showing connections of the coaxial cable of the wireless communication device according to the second embodiment of the present disclosure.

Referring to FIG. 8 and FIG. 9, FIG. 8 is a schematic view of the antenna element and the power divider of the wireless communication device according to a second embodiment of the present disclosure, and FIG. 9 is a schematic view showing connections of the coaxial cable of the wireless communication device according to the second embodiment of the present disclosure. The wireless communication device W of the second embodiment has a structure similar to that of the first embodiment, and the similarities therebetween will not be reiterated herein. In the second embodiment, the two first coupling sections P12 of the first power divider P1, the two second coupling sections P22 of the second power divider P2, the two third coupling sections P32 of the third power divider P32, and the two fourth coupling sections P42 of the fourth power divider P4 are disposed on the first surface 11 of the carrier 1, and the first extension section P11 of the first power divider P1, the second extension section P21 of the second power divider P2, the third extension section P31 of the third power divider P3, and the fourth extension section P41 of the fourth power divider P4 are also disposed on the first surface 11 of the carrier 1. In addition, it should be noted that the first input section P111 of the first power divider P1, the second input section P211 of the second power divider P2, the third input section P311 of the third power divider P3, and the fourth input section P411 of the fourth power divider P4 are all electrically connected to the signal lines 80 on the second surface 12 of the carrier 1 through the conductive vias V.

Third Embodiment

Figure 10:
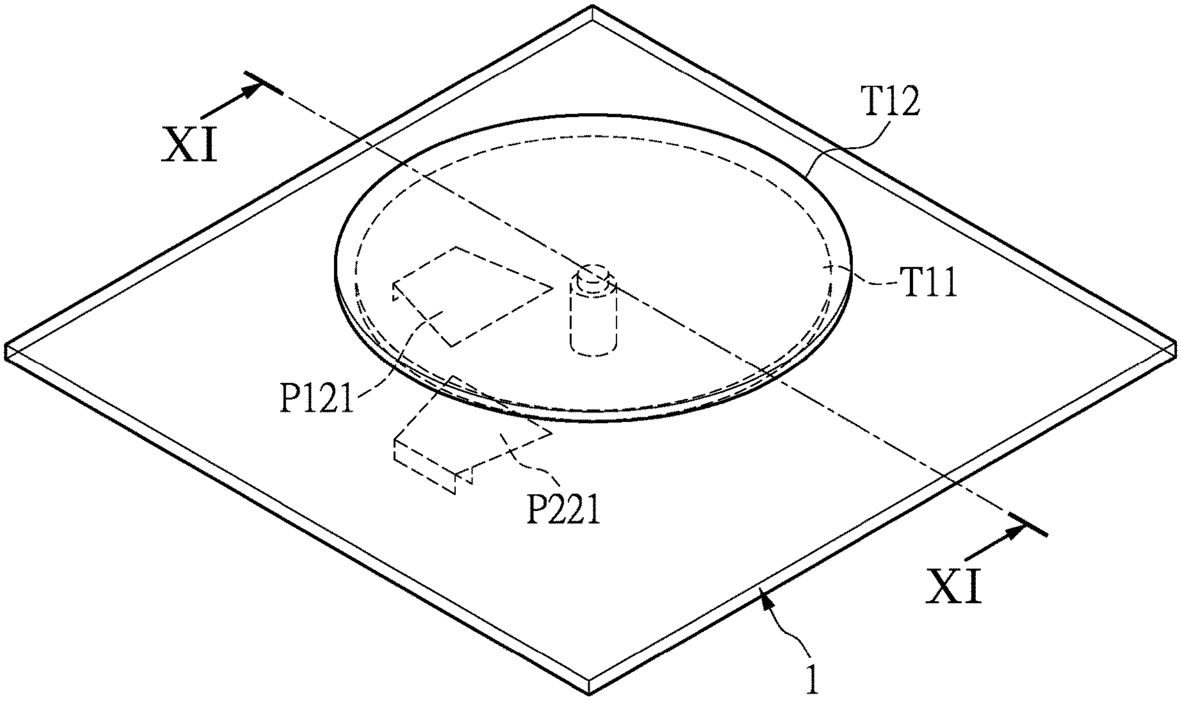
FIG. 10 is a schematic view of one of multiple antenna arrays of the wireless communication device according to a third embodiment of the present disclosure.
Figure 11:
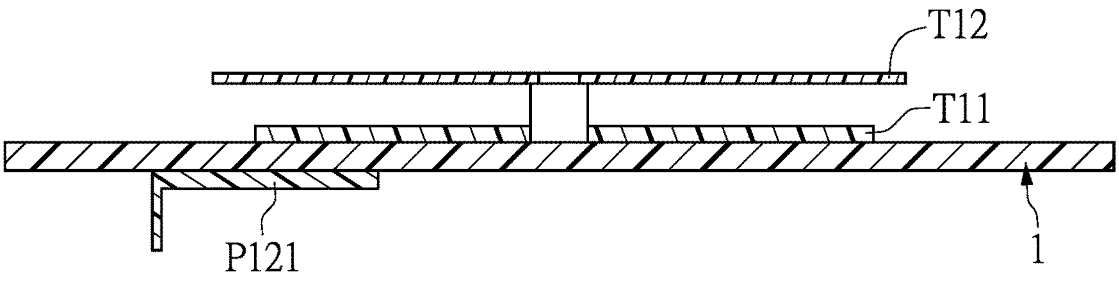
FIG. 11 is a schematic cross-sectional view taken along line XI-XI of FIG. 10.

Referring to FIG. 10 and FIG. 11, FIG. 10 is a schematic view of one of multiple antenna arrays of the wireless communication device according to a third embodiment of the present disclosure, and FIG. 11 is a schematic cross-sectional view taken along line XI-XI of FIG. 10. The wireless communication device W of the third embodiment has a structure similar to that of the first embodiment, and the similarities therebetween will not be reiterated herein.

The main difference between the third embodiment and the first embodiment is as follows. In the third embodiment, the antenna elements have no notches, and the coupling sections of the power dividers are disposed on the second surface 12 of the carrier 1. Taking FIG. 2 of the first embodiment as an example, the two first coupling sections P12, the two second coupling sections P22, the two third coupling sections P32, and the two fourth coupling sections P42 are moved from the first surface 11 of the carrier 1 to the second surface 12 of the carrier 1, so as to form the antenna structure in the third embodiment. FIG. 10 and FIG. 11 only show a single first antenna element for illustration. When the coupling sections of the power dividers are disposed on the second surface 12 of the carrier 1, the first coupling portions P121 and the second coupling portions P221 are also disposed on the second surface 12 of the carrier 1. As shown in FIG. 11, projections of the first coupling portions P121 and the second coupling portions P221 onto the second surface 12 partially overlap with projections of the first antenna elements T11 onto the second surface 12. Therefore, the matching of the antenna arrays of the wireless communication device W can be adjusted through the overlapping projections between the coupling portions (the first coupling portions P121 and the second coupling portions P221) and the first antenna elements T11, and through the distance (i.e., the thickness of the carrier 1).

Beneficial Effects of the Embodiments

In conclusion, the wireless communication device W provided by the present disclosure can utilize the two second antenna elements T12 and the corresponding two first antenna elements T11, and the two fourth antenna elements T22 and the corresponding two third antenna elements T21 for formation of a stacked antenna array structure. In addition, the wireless communication device W can utilize the first power divider P1 and the second power divider P2 for being coupled to the two first antenna elements T11, and utilize the third power divider P3 and the fourth power divider P4 for being coupled to the two third antenna elements T21. Accordingly, the wireless communication device W can meet miniaturization requirements, achieve bandwidth improvements (3,300 MHz to 4,200 MHz), and maintain good antenna characteristics.

Furthermore, the wireless communication device W can integrate the antenna elements and the power dividers onto the carrier 1 by way of laser direct structuring. Through the laser direct structuring process, the antenna elements (the first antenna elements T11 and the third antenna elements T21) and the power dividers (the first power divider P1 to the fourth power divider P4) can be integrated onto the carrier 1, so as to ensure that the coupling gap G is constant and the short-circuit connection does not occur.

Furthermore, the wireless communication device W can utilize the coupling portions that are trapezoidal shaped for coupling and signal feeding. The impedance matching and coupling effects can be improved through the configuration of the coupling gap G and the laser direct structuring (LDS) process. In addition, the high-gain antenna characteristics can be achieved through the configuration of the first air gap H1 and the second air gap H2.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A wireless communication device, comprising:

a carrier having a first surface and a second surface that are opposite to each other;

a first antenna array disposed on the carrier, wherein the first antenna array includes:

two first antenna elements disposed on the first surface, wherein each of the two first antenna elements has two notches; and two second antenna elements respectively correspond to the two first antenna elements, and each of the two second antenna elements and a corresponding one of the first antenna elements are separate from and coupled to each other; and a first power divider disposed on the carrier, wherein the first power divider includes a first extension section and two first coupling sections, the first extension section is connected between the two first coupling sections, the two first coupling sections respectively have two first coupling portions, one of the two first coupling portions extends into one of the two notches, and the two first coupling sections and the two first antenna elements are separate with each other;

wherein the two first coupling sections are respectively coupled to the two first antenna elements, such that the first antenna array is used to generate a radiation pattern having a first polarization direction.

2. The wireless communication device according to claim 1, further comprising a second power divider disposed on the carrier, wherein the second power divider includes a second extension section and two second coupling sections, the second extension section is connected between the two second coupling sections, and the two second coupling sections and the two first antenna elements are separate with each other; wherein the two second coupling sections are respectively coupled to the two first antenna elements, such that the first antenna array is used to generate a radiation pattern having a second polarization direction, and the first polarization direction and the second polarization direction are orthogonal to each other.

3. The wireless communication device according to claim 2, wherein the two second coupling sections respectively have two second coupling portions, one of the two second coupling portions extends into the two notches; wherein an edge of each of the two notches and a corresponding one of the first coupling portions and the second coupling portions have a coupling gap therebetween, and the coupling gap ranges between 0.2 mm and 2 mm.

4. The wireless communication device according to claim 3, wherein each of the first coupling portions and each of the second coupling portions have a trapezoidal shape, an inverted trapezoidal shape, or a rectangular shape.

5. The wireless communication device according to claim 3, wherein each of the first coupling portions and the second coupling portions define a boundary line along an outline of the first antenna element, the boundary line and the corresponding one of the first coupling portions and the second coupling portions have a maximum distance therebetween, and a ratio of the maximum distance to a diameter of the first antenna element ranges between 0.1 and 0.24.

6. The wireless communication device according to claim 2, further comprising a second antenna array, a third power divider, and a fourth power divider, wherein the second antenna array is disposed on the carrier and arranged side by side with the first antenna array, the second antenna array includes two third antenna elements and two fourth antenna elements, the two third antenna elements are disposed on the first surface of the carrier, the two fourth antenna elements are disposed on the carrier and respectively correspond to the two third antenna elements, each of the third antenna elements and a corresponding one of the fourth antenna elements are separate from and coupled to each other, the third power divider includes a third extension section and two third coupling sections, the third extension section is connected between the two third coupling sections, the two third coupling sections and the two third antenna elements are separate with each other, the fourth power divider includes a fourth extension section and two fourth coupling sections, the fourth extension section is connected between the two fourth coupling sections, and the two fourth coupling sections and the two third antenna elements are separate with each other; wherein the two third coupling sections are respectively coupled to the two third antenna elements, such that the second antenna array is used to generate a radiation pattern having a third polarization direction; wherein the two fourth coupling sections are respectively coupled to the two third antenna elements, such that the second antenna array is used to generate a radiation pattern having a fourth polarization direction, and the third polarization direction and the fourth polarization direction are orthogonal to each other.

7. The wireless communication device according to claim 6, wherein the first power divider, the second power divider, the third power divider, and the fourth power divider are alternately arranged, the first power divider and the second power divider are respectively disposed at two sides of the first antenna array, the third power divider and the fourth power divider are respectively disposed at two sides of the second antenna array, and the second power divider and the third power divider are arranged between the first antenna array and the second antenna array.

8. The wireless communication device according to claim 6, wherein an orthogonal projection of each of the second antenna elements projected onto the carrier completely overlaps with an orthogonal projection of a corresponding one of the first antenna elements projected onto the carrier, and an orthogonal projection of each of the fourth antenna elements projected onto the carrier completely overlaps with an orthogonal projection of a corresponding one of the third antenna elements projected onto the carrier.

9. The wireless communication device according to claim 6, wherein an orthogonal projection of each of the second antenna elements projected onto the carrier is greater than an orthogonal projection of a corresponding one of the first antenna elements projected onto the carrier, and an orthogonal projection of each of the fourth antenna elements projected onto the carrier is greater than an orthogonal projection of a corresponding one of the third antenna elements projected onto the carrier.

10. The wireless communication device according to claim 6, wherein the first antenna array and the second antenna array are configured to operate in an operating frequency band, two center points of the two first antenna elements or the two second antenna elements have a first predetermined distance therebetween, the first predetermined distance is greater than one-half wavelength of a center frequency of the operating frequency band, two center points of the two third antenna elements or the two fourth antenna elements have a second predetermined distance therebetween, and the second predetermined distance is greater than one-half wavelength of a center frequency of the operating frequency band.

11. The wireless communication device according to claim 2, wherein the two first coupling sections and the two second coupling sections are disposed on the second surface of the carrier.

12. The wireless communication device according to claim 2, wherein the two first coupling sections and the two second coupling sections are disposed on the first surface of the carrier.

13. The wireless communication device according to claim 1, wherein the first extension section and the second extension section are disposed on the first surface of the carrier.

14. The wireless communication device according to claim 1, wherein the first extension section and the second extension section are disposed on the second surface of the carrier.

15. The wireless communication device according to claim 1, further comprising a ground plate disposed at one side of the carrier, wherein the ground plate and the second surface of the carrier have a first air gap therebetween, each of the first antenna elements and a corresponding one of the second antenna elements have a second air gap therebetween, and the second air gap is greater than the first air gap.

16. The wireless communication device according to claim 15, further comprising a mainboard, wherein the mainboard and the carrier are respectively disposed at two opposite sides of the ground plate, the mainboard includes a radio frequency module, and the radio frequency module is electrically connected to the first extension section of the first power divider.

* * * * *